Figure 1:
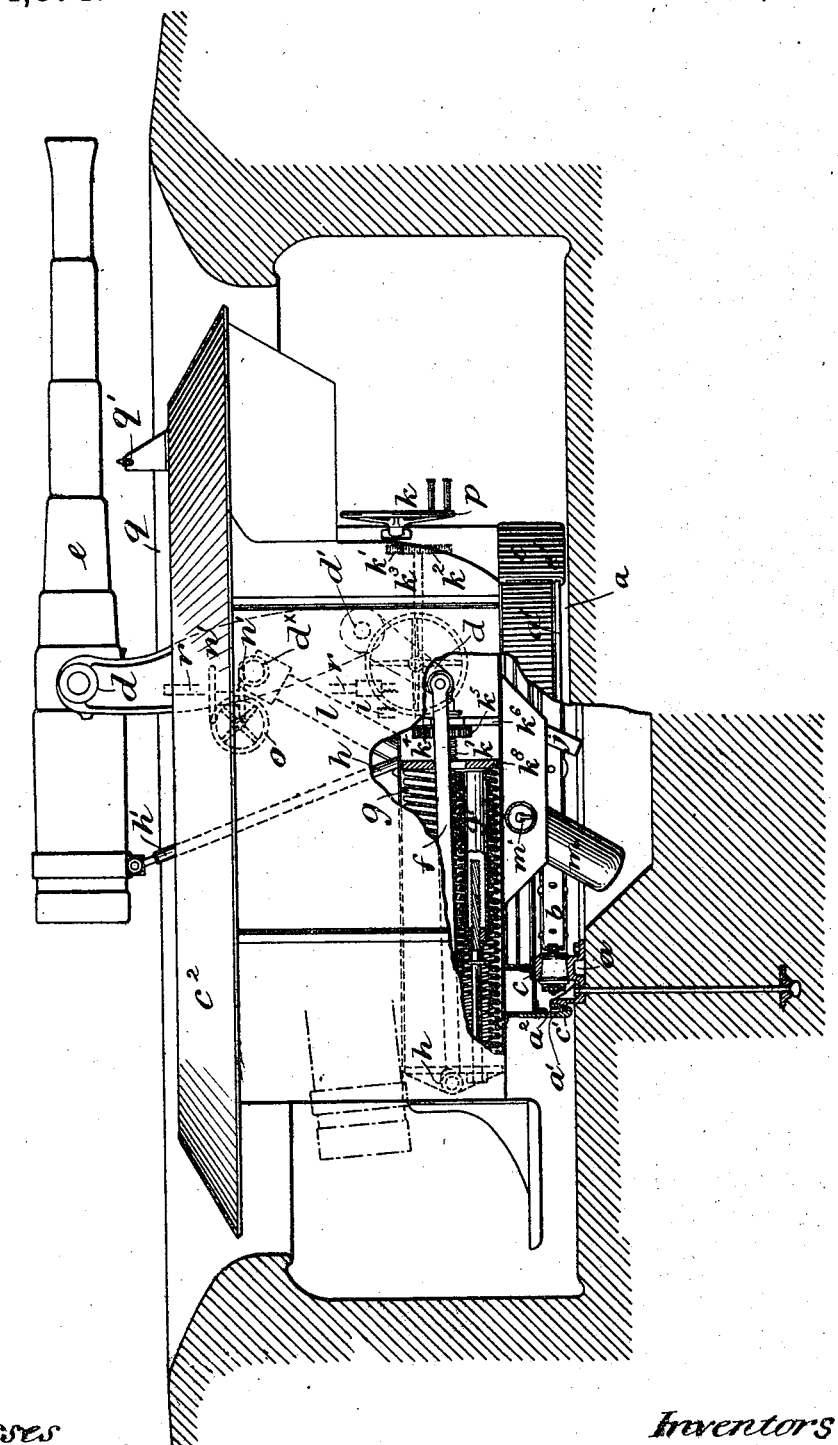

(No Model.) 6 Sheets—Sheet 2.

A. NOBLE & C. H. MURRAY.
APPARATUS FOR WORKING DISAPPEARING GUNS.

No. 484,374. Patented Oct. 11, 1892.

Witnesses
P. Washington Miller
Balt... D. Long

Inventors
Andrew Noble,
Charles H. Murray,
By their Attorneys
Baldwin Davidson & Wight (No Model.) 6 Sheets—Sheet 3.
A. NOBLE & C. H. MURRAY.
APPARATUS FOR WORKING DISAPPEARING GUNS.

No. 484,374. Patented Oct. 11, 1892.

(No Model.) 6 Sheets—Sheet 4.

A. NOBLE & C. H. MURRAY.
APPARATUS FOR WORKING DISAPPEARING GUNS.

No. 484,374. Patented Oct. 11, 1892.

Witnesses
B. Washington Miller
Baltus DeLong

Inventors
Andrew Noble
Charles H. Murray
By their Attorneys
Baldwin, Davidson & Wight (No Model.) 6 Sheets—Sheet 5.

A. NOBLE & C. H. MURRAY.
APPARATUS FOR WORKING DISAPPEARING GUNS.

No. 484,374. Patented Oct. 11, 1892.

Witnesses
P. Washington Miller
Baltus De Long.

Inventors
Andrew Noble,
Charles H. Murray,
By their Attorneys,
Baldwin Davidson & Wight.

(No Model.) 6 Sheets—Sheet 6.

A. NOBLE & C. H. MURRAY.
APPARATUS FOR WORKING DISAPPEARING GUNS.

No. 484,374. Patented Oct. 11, 1892.

Witnesses
B. W. Miller
C. F. Sensner

Inventors
Andrew Noble,
Charles H. Murray,
By his Attorneys,
Baldwin, Davidson & Wight

UNITED STATES PATENT OFFICE.

ANDREW NOBLE AND CHARLES H. MURRAY, OF NEWCASTLE-UPON-TYNE, ENGLAND, ASSIGNORS TO THE SIR W. G. ARMSTRONG, MITCHELL & COMPANY, LIMITED, OF SAME PLACE.

APPARATUS FOR WORKING DISAPPEARING GUNS.

SPECIFICATION forming part of Letters Patent No. 484,374, dated October 11, 1892.

Application filed November 27, 1891. Serial No. 413,313. (No model.)

*To all whom it may concern:*

Be it known that we, ANDREW NOBLE, a Companion of the Bath, late captain in the Royal Artillery, and manufacturing engineer, and CHARLES HENRY MURRAY, engineer, subjects of the Queen of Great Britain, both residing at the Elswick Works, Newcastle-upon-Tyne, England, have invented certain new and useful Improvements in Apparatus for Working Disappearing Guns, of which the following is a specification.

In ordinary disappearing-gun carriages the weight of the gun is balanced by the tension of compressed air made to act through the medium of a liquid, or if steel springs are used they also act not directly, but through the medium of a liquid. Both these methods lead to complications and necessitate great care in the use of the carriage to prevent leakage of the liquid or of the air.

According to our invention we apply steel springs in such a way and of such sufficient power as to act directly on the gun-carriage and balance the weight of the gun at any position between the extremes of right up or right down. These springs we arrange so that they can be slacked off or tightened up in order to cause the gun to come down without being fired or to rise to the firing position when it is desired to fire the gun. Having by this means balanced the gun, so that it is in the same condition as if supported in one scale-pan of a pair of scales and capable of being made to rise or fall by the addition or subtraction to or from the counterpoise in the other scale, which addition or subtraction only amounts to what is necessary to overcome the friction of the pivots on which the system turns, we arrange to absorb the recoil energy by a cylinder and piston entirely separated and not connected with or interfering with the gear by which the gun is raised or lowered.

To put an end to the trouble caused by leakage, we construct the recoil-cylinder of one casting made without any bottom plug or joint of any sort. At the top we form a reservoir, so that more liquid than is required for safety may be used to allow for loss by evaporation or other causes and to give space for the liquid displaced by the piston-rod when it enters the cylinder as the gun comes down. The cylinder we fit with a piston and rod, the piston sliding easily in the cylinder and being made with ports or openings through which the liquid must pass when the piston is driven to the bottom of the cylinder on the recoil of the gun. The ports in the piston are gradually closed in the usual manner by tapered keys fixed to the inside of the cylinder, so that the resistance to the recoil is equalized throughout the stroke and the length of recoil is about the same for all charges. The piston-rod passes through an opening in the cylinder, closely fitting it; but no packing is needed, as no pressure exists at any time at the top side of or above the piston. The steel springs by which the weight of the gun is balanced are conveniently placed horizontally in two boxes, one on either side of the recoil-cylinder. To the rear the springs press upon vertical plates pivoted at their centers to long connecting-rods, the other ends of these connecting-rods being attached to lever-arms formed on the main levers or rocking carriage by which the gun is carried up or down. With the gun down these springs are in the state of greatest compression. The gun in rising pursues a circular path and the force required to balance it is regularly reduced from bottom to top. The springs, also, as they are relaxed are naturally also reduced in power, and we arrange that the springs shall be of such a size and length that these reductions correspond with one another, so that as the load requiring balancing is diminished the spring-power to balance shall be diminished by a corresponding amount. At the front end of the springs we place another vertical plate which can be moved backward or forward a certain amount in a horizontal direction by a powerful screw and train of wheel-gear worked by hand. By this means we compress the springs a little more to cause the gun to rise or slack them off a little to cause the gun to descend when it is desired to bring the gun down without firing it.

On the shield which closes the mouth of the gun-pit we carry a set of sights instead of fitting them to the gun, where they are usually fitted in the case of disappearing carriages and where they are awkward to reach, owing to the gun being so high, and where it is necessary to reach them by folding ladders and platforms, owing to the gun having to recoil and descend. The sights on the shield we work automatically from the elevating-gear by a rack, toothed wheels, and the necessary rods, so that the rear sight is driven to move degree for degree with the movement of the gun. We also extend the training-gear, so as to provide a hand-wheel within reach of the man sighting the gun, and by these means he is able to keep his eye on the object of aim up to the moment of firing without having to step aside to clear the gun. To the rear or tangent sight we fit not only an ordinary sight and a telescope, but also a pair of mirrors so attached that they move with and are one with the tangent-sight. This enables the man sighting the gun to bring his head under the protection of the parapet and to see in the lower mirror the reflection of the front and rear sights and the object of aim. Inasmuch as it is the actual sights which are seen reflected, no errors in the setting of the mirrors will introduce errors into the aim.

With suitable modifications we construct siege-carriages on the system explained above, the invention being, on account of its simplicity, particularly suitable for that purpose, as the readiness with which the carriage can be prepared for action is of especial importance in siege operations.

In order that our invention may be fully understood and readily carried into effect, we will proceed to describe the drawings hereunto annexed.

Figure 2:
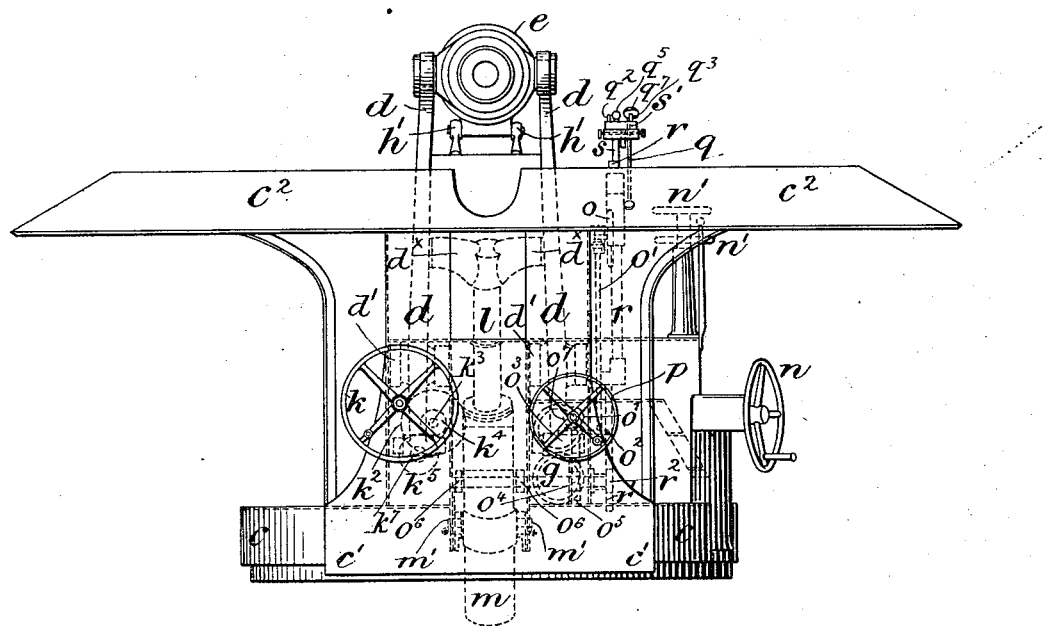
Figure 3:
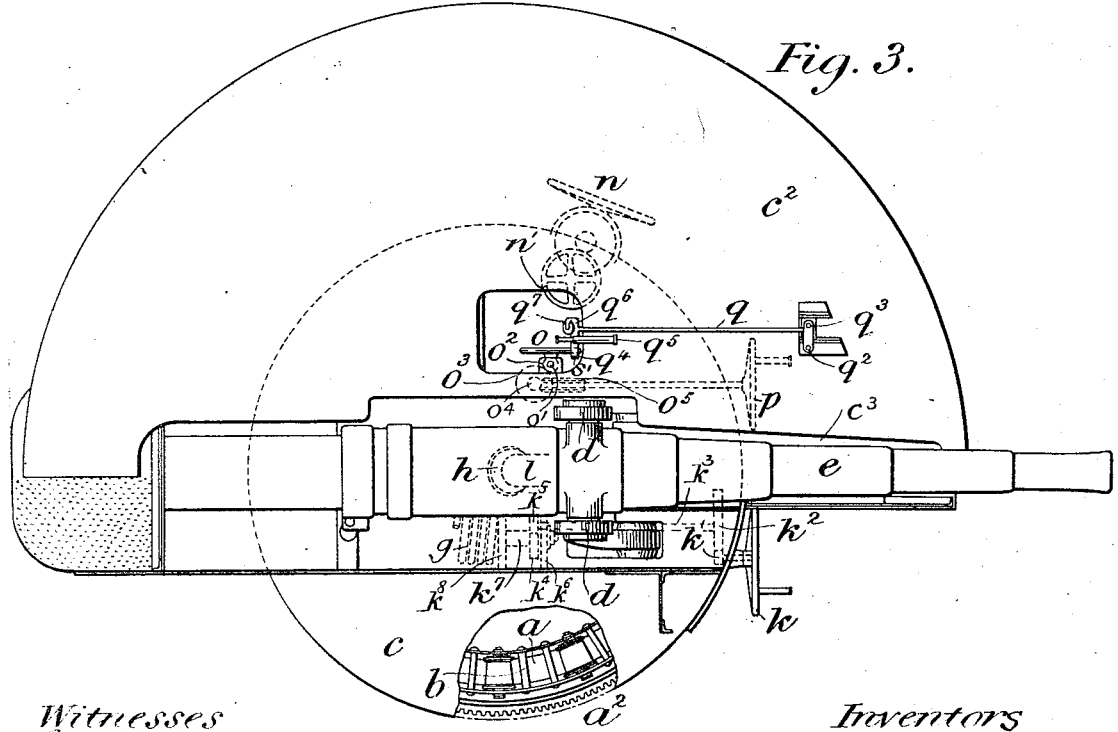
Figure 4:
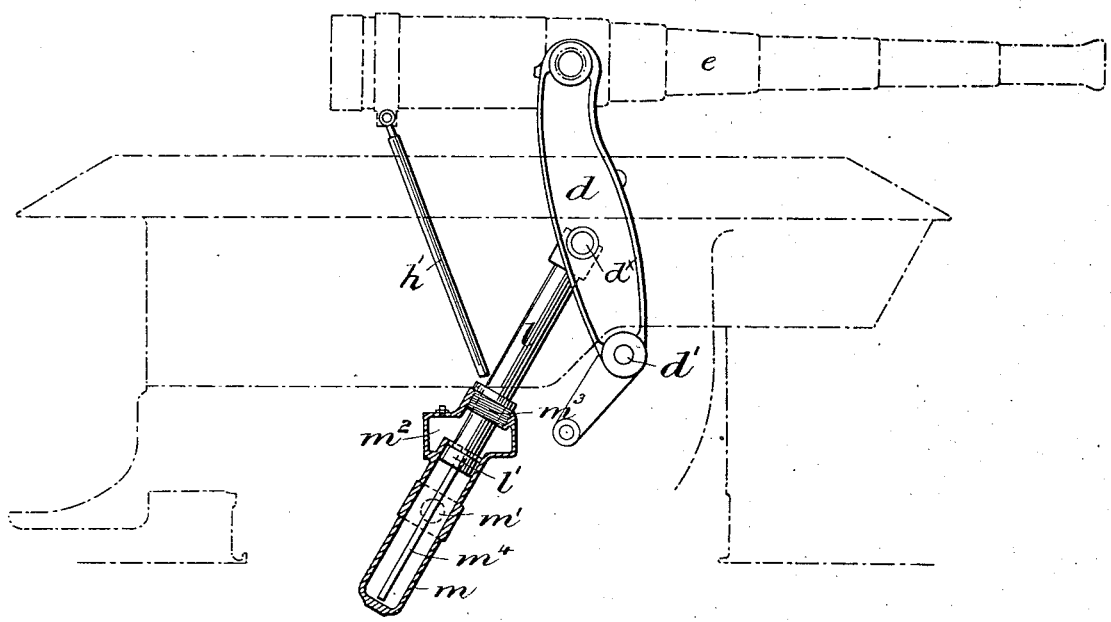
Figure 5:
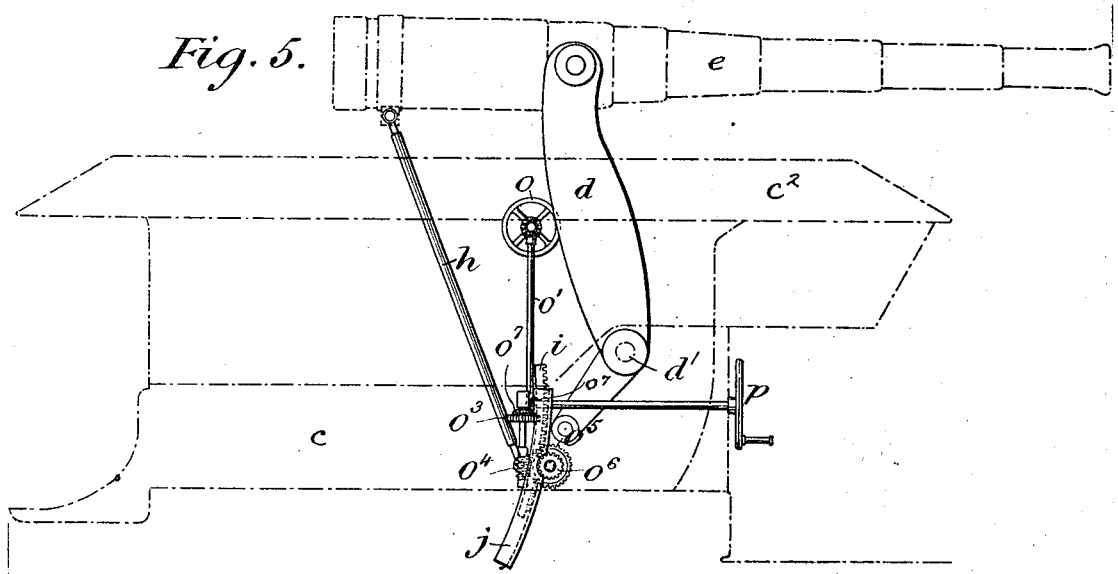
Figure 6:
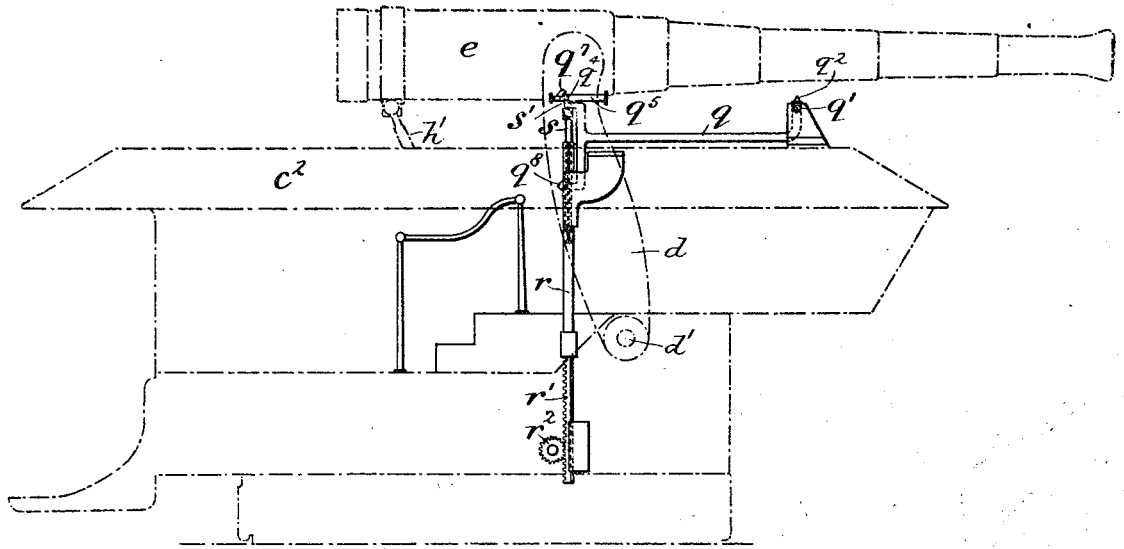
Figure 7:
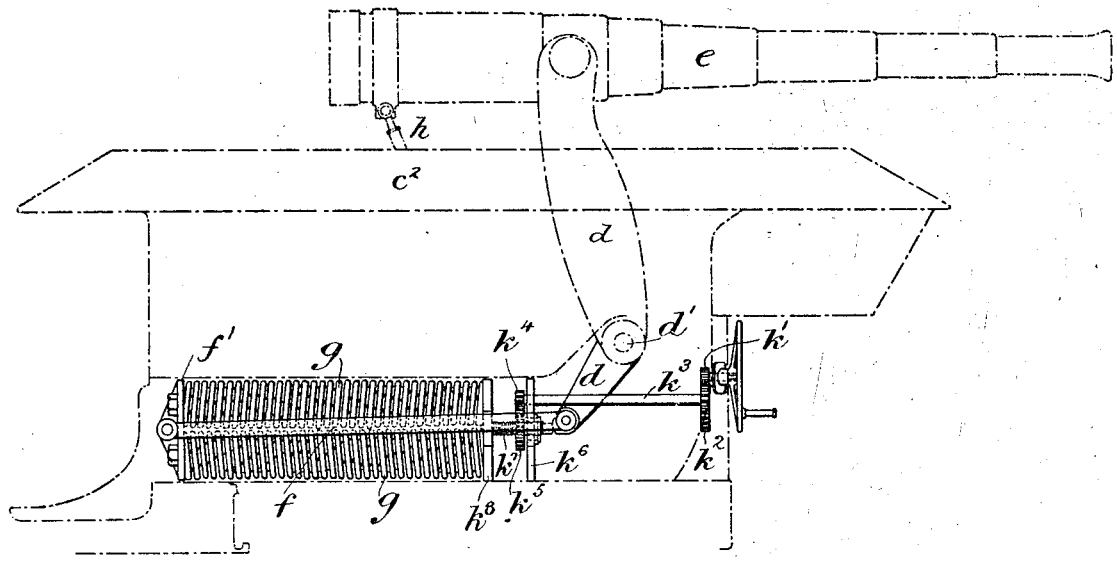
Figure 8:
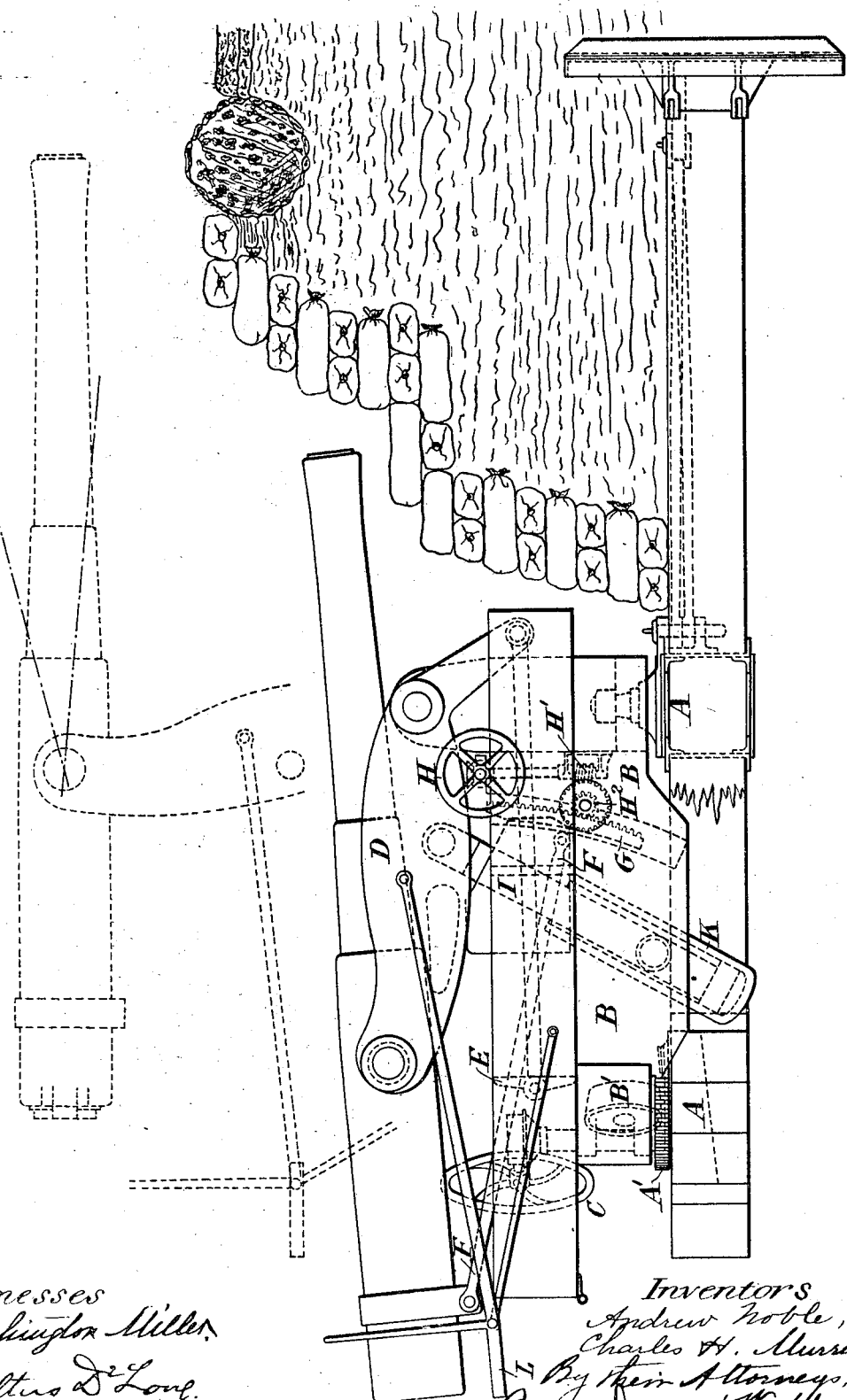

Figure 1 is a side elevation, partly in section, of a disappearing-gun mounting in accordance with our invention. Fig. 2 is a front elevation, and Fig. 3 is a plan of the same with parts removed. Figs. 4, 5, 6, and 7 are elevations. Fig. 4 shows more especially the recoil-cylinder. Fig. 5 shows more especially the elevating-gear, and Fig. 6 shows more especially the sighting-gear. Fig. 7 shows more especially the manual gear for varying the compression of the balancing-springs to raise and to lower the gun. Fig. 8 shows the modification of the mounting adapting it for siege purposes; and Fig. 9 is a view, on an enlarged scale, of the training-gear.

Referring more especially to Figs. 1 and 6, $a$, Fig. 1, is a ring-rail firmly bolted down to a concrete foundation. $b$ is a ring with live rollers running upon the rail $a$ and supporting a platform or rotating structure $c$, which is controlled, also, by clips $c'$ upon it embracing a flange $a'$ upon the ring-rail. The upper part of the structure $c$ forms a roof $c^2$, which incloses the shelter-pit for containing the gun and mechanism. There is an opening $c^3$, Fig. 3, in this roof, through which the gun rises to fire. $d\ d$ are a pair of levers fixed to an axis $d'$, the bearings for which are upon the structure $c$. The gun $e$ is carried by its trunnions in bearings at the upper ends of the levers $d$, and the lower ends of these levers are connected by rods $f f$, Figs. 1 and 7, with plates, Figs. 1 and 7, upon which springs $g\ g$ abut. $g'$, Fig. 1, is a telescopic core around which the springs $g$ are arranged. The breech of the gun is connected by links $h'\ h'$ with curved racks $i$, Fig. 5, which are movable along guides $j$, fixed to the structure $c$. The movement of the levers $d$ and links $h$ around their pivots allows the gun to rise to the firing position and descend to the loading position, and the compression of the springs $g$ is such as approximately to counterpoise the weight of the gun in every position. To raise and lower the gun, the compression of one set of the springs $g$ is increased or diminished by turning a hand-wheel $k$, Figs. 1 and 7, which by gear-wheels $k'\ k^2$ turns the axis $k^3$, on which is a pinion $k^4$. The pinion $k^4$, Fig. 7, gears with teeth $k^5$, formed on the periphery of a screw-nut $k^{10}$, which is able to turn in a support $k^6$, Fig. 1. The nut rotates upon a screw $k^7$, which cannot rotate and is fixed to the plate $k^8$. This plate $k^8$ is the abutment for the springs $g$, and by the means described it can be moved to and fro along the spring-case. Thus by turning the wheel $k$ the gun can be raised and lowered at will, and little power is required beyond that needed to overcome the friction of the parts. The recoil on firing is resisted by the rod $l$. The rod $l$ is furnished with a piston $l'$, Figs. 1 and 4, and the cross-head at its upper end is jointed to the levers $d$ at $d^x$. The cylinder $m$ can rock on trunnions $m'$. It is provided with a reservoir-chamber $m^2$ to contain a sufficient store of water or liquid, and it is closed at the top by the unpacked ring $m^3$. The piston $l'$ has notches in it, and inclines $m^4$ within the cylinder partially fill the notches, leaving a water-way suitably contracted in every position of the piston to moderate the speed of the gun in recoil. This recoil apparatus, it will be observed, is entirely independent of the springs which counterpoise the gun and the mechanism by which the gun is raised and lowered.

Figure 9:
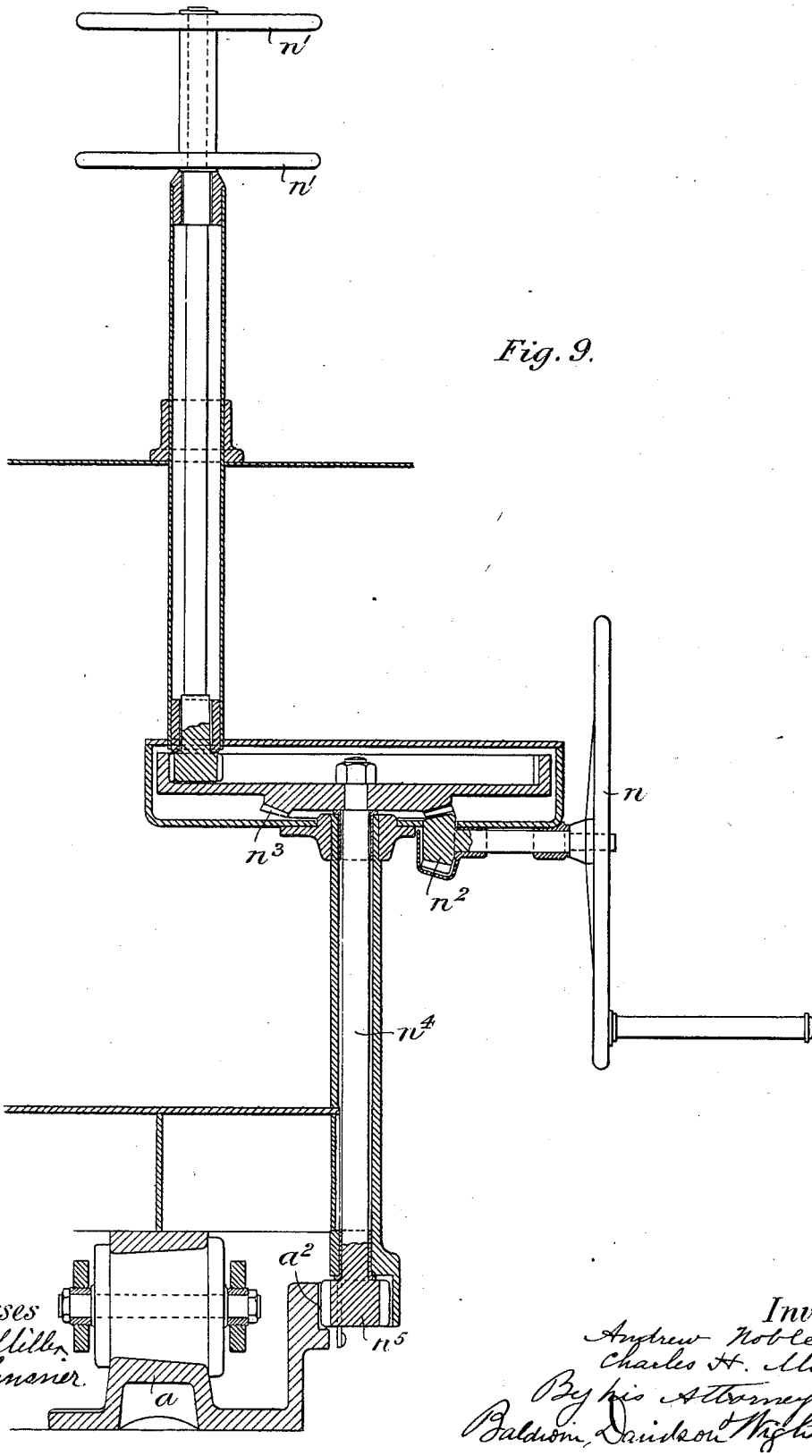

The training of the gun and structure to lay the gun on the mark is effected by turning a hand-wheel $n$, Figs. 2, 3, and 9, which, operating through bevel-wheels $n^2\ n^3$ and shaft $n^4$, turns a pinion $n^5$, engaged with the ring of teeth $a^2$, Figs. 1 and 9, upon the ring-rail $a$. There are other hand-wheels $n'\ n'$, Fig. 9, within reach of the man who lays the gun by which the training motion may also be given. The required angle of elevation or depression for the gun when in the firing position is given by turning the hand-wheels $o$ and $p$, Fig. 5. The wheel $o$ is within reach of the man who aims the gun and is used for making the final adjustment, the greater part of the movement being made by the wheel $p$. The wheel $o$, Fig. 5, by beveled gear turns the shaft $o'$, on which is a pinion $o^2$, Fig. 3, engaged with a wheel $o^3$ on the axis of a worm $o^4$, which is engaged with a worm-wheel $o^5$. On the axis of the worm-wheel $o^5$ are pinions $o^6$, which engage with the curved racks $i\,i$. The axis of the wheel $p$ is connected by beveled gear $o^7$ with the axis of the wheel $o^3$. On the roof $c^2$ there is a support upon which the pivots $q'$, Figs. 1 and 6, of the sight-bar $q$ rest, and the other end of the sight-bar is supported by the upright bar $r$ and parts $s$ and $s'$. The bar $r$ slides through guides upon the structure $c$. It has at its lower end a rack $r'$, which is engaged with a toothed wheel $r^2$ upon the same axis with the pinions $o^6\,o^6$, Fig. 2. The gear is so proportioned that the sight-bar $q$ and the axis of the gun make equal angular movements when the hand-wheels $o$ and $p$ are turned. On the sight-bar are the fore sights $q^2\,q^3$, the ordinary rear sight $q^4$, the sighting-telescope $q^5$, the mirror-sight $q^6$, and mirror $q^7$. $q^8$, Fig. 6, is another mirror on the sight-bar at a lower level. The bar $r$ has a socket at its upper end, and into this a stem $s$ is received. This is graduated for range and to adjust the sight is raised and lowered in the socket in the usual way. Upon the head of the stem $s$ there is a slider $s'$, which is movable transversely to correct for wind, speed, &c., in the usual way. The slider $s'$ carries the rear end of the sight-bar.

In Fig. 8, A is the ordinary pivot and platform for a siege-gun. B is a bed-frame capable of turning about the pivot A and also supported by wheels B'. C is a hand-wheel for training. It drives a pinion in gear with a curved rack A', fixed upon the platform A. D are the levers which carry the gun, as before. At their lower ends they are connected with plates E, on which coiled springs press, and these springs counterpoise the weight of the gun, as already explained. In this case, however, the hand-gear for varying the compression of the springs is dispensed with. F F are links connecting the breech of the gun with the curved racks G, which are raised and lowered to vary the elevation of the gun in the firing position. This is effected by means of the hand-wheel H, which by beveled gear turns the screw H', and this is engaged with a worm-wheel on the axis of the pinions H². The recoil is resisted by the piston and rod I, working in the cylinder K. L is a jointed platform rising and falling with the gun.

Having now particularly described and ascertained the nature of our said invention and in what manner the same is to be performed, we declare that what we claim is—

1. The combination of a gun with recoil apparatus operatively connected therewith to absorb the energy of recoil, balancing-springs suitably supported and operatively connected with the gun to act directly upon it to approximately counterpoise the gun in all its positions, and hand-gearing operatively connected with the springs to act thereon to compress or relax them to thereby raise or lower the gun without firing.

2. In a disappearing-gun mounting, the combination of a lever pivoted on a stationary axis, the gun having trunnions with bearings in the upper end of the lever, balancing-springs, connections between the balancing-springs and the lever beneath its pivot, and hand-gearing operatively connected with the springs to act through them upon the lever, the organization being such that without firing the gun can be lowered from the elevated firing position to the concealed loading position, there retained as long as may be desired, and afterward again raised to the firing position.

3. In a gun-mounting, the combination, substantially as hereinbefore set forth, of the gun, means for raising and lowering it, a recoil-cylinder having a reservoir without packing or joints suitably supported in the mounting, placed upright, so that the liquid cannot be lost by leakage, and a piston working in the cylinder and operatively connected with the gun.

4. The combination, substantially as set forth, of the gun, its supports, means for raising and lowering the gun, the automatic compound sights having ordinary telescope and mirror sights, all moving together in adjustment as to wind, speed, and distance of the enemy, and gearing between the elevating-gear and the sights, whereby the sights are moved correspondingly with the gun.

5. The combination of the gun, its supports, elevating-gear for raising and lowering the gun, a sight-bar having front and rear sights, and connections between the sight-bar and the elevating-gear, whereby the rear sight is moved correspondingly with the movement of the gun.

A. NOBLE.
C. H. MURRAY.

Witnesses:
W. J. OGLE,
WM. RAMAGE.